United States Patent
Sarkar et al.

(10) Patent No.: US 8,009,617 B2
(45) Date of Patent: Aug. 30, 2011

(54) BEAMFORMING OF CONTROL INFORMATION IN A WIRELESS COMMUNICATION SYSTEM

(75) Inventors: Sandip Sarkar, San Diego, CA (US); Byoung-Hoon Kim, Seoul (KR); Durga Prasad Malladi, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 12/189,548

(22) Filed: Aug. 11, 2008

(65) Prior Publication Data

US 2009/0046582 A1 Feb. 19, 2009

Related U.S. Application Data

(60) Provisional application No. 60/956,106, filed on Aug. 15, 2007.

(51) Int. Cl.
*H04W 4/00* (2009.01)
(52) U.S. Cl. ........ 370/328; 370/329; 370/331; 370/336; 370/345; 455/63.1; 455/450; 455/562.1
(58) Field of Classification Search .................. None
See application file for complete search history.

(56) References Cited

U.S. PATENT DOCUMENTS

| | | | |
|---|---|---|---|
| 2004/0042428 A1* | 3/2004 | Hamalainen et al. | 370/335 |
| 2004/0062211 A1* | 4/2004 | Uhlik | 370/278 |
| 2004/0085939 A1 | 5/2004 | Wallace et al. | |
| 2005/0201486 A1* | 9/2005 | Han et al. | 375/295 |
| 2007/0005749 A1 | 1/2007 | Sampath | 709/223 |
| 2007/0087749 A1 | 4/2007 | Ionescu et al. | |
| 2007/0097856 A1 | 5/2007 | Wang et al. | |
| 2007/0099578 A1 | 5/2007 | Adeney et al. | |
| 2007/0160156 A1 | 7/2007 | Melzer et al. | |
| 2007/0160162 A1 | 7/2007 | Kim et al. | |

(Continued)

FOREIGN PATENT DOCUMENTS

EP 1562306 A1 8/2005

(Continued)

OTHER PUBLICATIONS

3GPP TS 36.211, "3rd Generation Partnership Project: Technical Specification Group Radio Access Network; Physical Channels and Modulation (Release 8)", Jun. 2007, sections 4, 5.4, 5.8, 5.9 and 6.5, v1.2.0, 3GPP, Valbonne, France.

(Continued)

*Primary Examiner* — Chi H. Pham
*Assistant Examiner* — Shick Hom
(74) *Attorney, Agent, or Firm* — Jeffrey D. Jacobs (57) ABSTRACT

Techniques for sending traffic data and control information in a wireless communication system are described. In one design, a transmitter (e.g., a Node B or a UE) may perform beamforming to send traffic data on M layers based on a precoding matrix, where M may be one or greater. The transmitter may also perform beamforming to send control information on up to M layers based on the same precoding matrix used for the traffic data. The transmitter may send the beamformed traffic data on a first physical channel and may send the beamformed control information on a second physical channel. The transmitter may multiplex the beamformed traffic data and the beamformed control information using time division multiplexing (TDM) or frequency division multiplexing (FDM).

25 Claims, 8 Drawing Sheets

U.S. PATENT DOCUMENTS

| | | | |
|---|---|---|---|
| 2007/0291868 A1* | 12/2007 | Olesen et al. | 375/267 |
| 2008/0225960 A1 | 9/2008 | Kotecha et al. | |
| 2008/0227495 A1 | 9/2008 | Kotecha et al. | |
| 2008/0310353 A1* | 12/2008 | Love et al. | 370/329 |

FOREIGN PATENT DOCUMENTS

| WO | WO2006130865 | 12/2006 |
|---|---|---|
| WO | WO2008103313 | 8/2008 |

OTHER PUBLICATIONS

Hemanth Sampath: "Linear Preceding and Decoding for Multiple Input Multiple Output (MIMO) Wireless Channels" PHD Dissertation, Apr. 1, 2001, pp. 1-157, XP002245817 Stanford university the whole document.

International Search Report and the Written Opinion—PCT/US2008/073394, International Search Authority—European Patent Office—Dec. 17, 2008.

* cited by examiner

BEAMFORMING OF CONTROL INFORMATION IN A WIRELESS COMMUNICATION SYSTEM

The present application claims priority to provisional U.S. Application Ser. No. 60/956,106, entitled "BEAMFORMING FOR TDD IN LTE," filed Aug. 15, 2007, assigned to the assignee hereof and incorporated herein by reference.

BACKGROUND

I. Field

The present disclosure relates generally to communication, and more specifically to techniques for sending control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may send traffic data and/or control information on the downlink to a user equipment (UE). The control information sent on the downlink may convey a downlink assignment, an uplink assignment, and/or other information for the UE. The UE may also send traffic data and/or control information on the uplink to the Node B. The control information sent on the uplink may convey channel quality indicator (CQI) information, acknowledgement (ACK) information for the traffic data sent on the downlink, and/or other information. The control information sent on each link may be useful but represents overhead. It is desirable to efficiently and reliably send control information in order to achieve good performance.

SUMMARY

Techniques for sending traffic data and control information in a wireless communication system are described herein. In an aspect, a transmitter (e.g., a Node B or a UE) may send traffic data with beamforming and may also send control information with beamforming in order to improve coverage and/or obtain other benefits. In one design, the transmitter may perform beamforming to send traffic data based on a precoding matrix. The traffic data may be sent on M layers, where M may be one or greater. The transmitter may also perform beamforming to send control information on up to M layers based on the same precoding matrix used for the traffic data. The transmitter may send the beamformed traffic data on a first physical channel (e.g., a shared data channel) and may send the beamformed control information on a second physical channel (e.g., a shared control channel). The transmitter may multiplex the beamformed traffic data and the beamformed control information using time division multiplexing (TDM) or frequency division multiplexing (FDM).

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
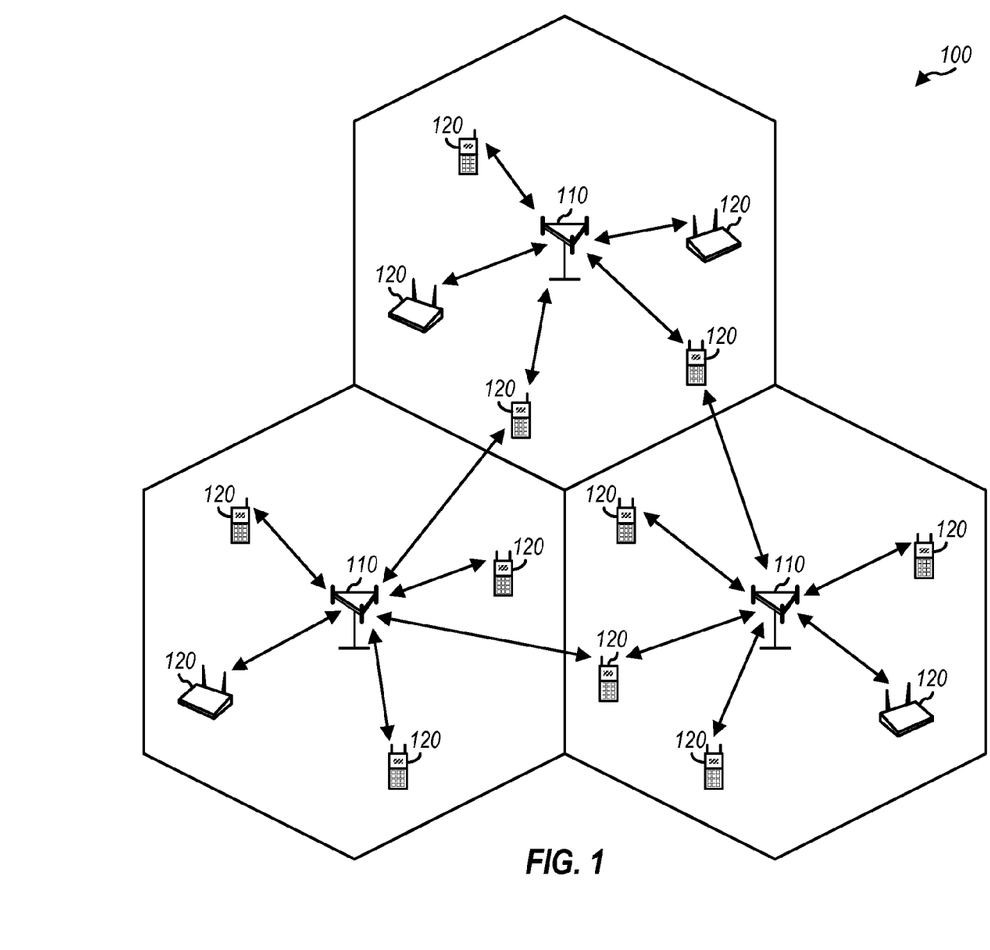
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. Each Node B 110 provides communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area. In 3GPP2, the term "sector" can refer to the smallest coverage area of a base station and/or a base station subsystem serving this coverage area. For clarity, 3GPP concept of cell is used in the description below.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

The system may support a set of physical channels for the downlink and another set of physical channels for the uplink. Each physical channel may carry traffic data, control information, etc. Table 1 lists some physical channels used for the downlink and uplink in LTE. In general, a system may support any set of physical channels for traffic data and control information for each link.

TABLE 1

| Channel | Channel Name | Description |
| --- | --- | --- |
| PDCCH | Physical Downlink Control Channel | Carry scheduling assignments and other control information on the downlink for UEs. |
| PDSCH | Physical downlink shared channel | Carry traffic data on the downlink for UEs. |
| PUCCH | Physical uplink control channel | Carry control information (e.g., ACK, CQI, PMI, and rank information) sent by UEs on the uplink. |
| PUSCH | Physical uplink shared channel | Carry traffic data sent by UEs on the uplink. |

Figure 2:
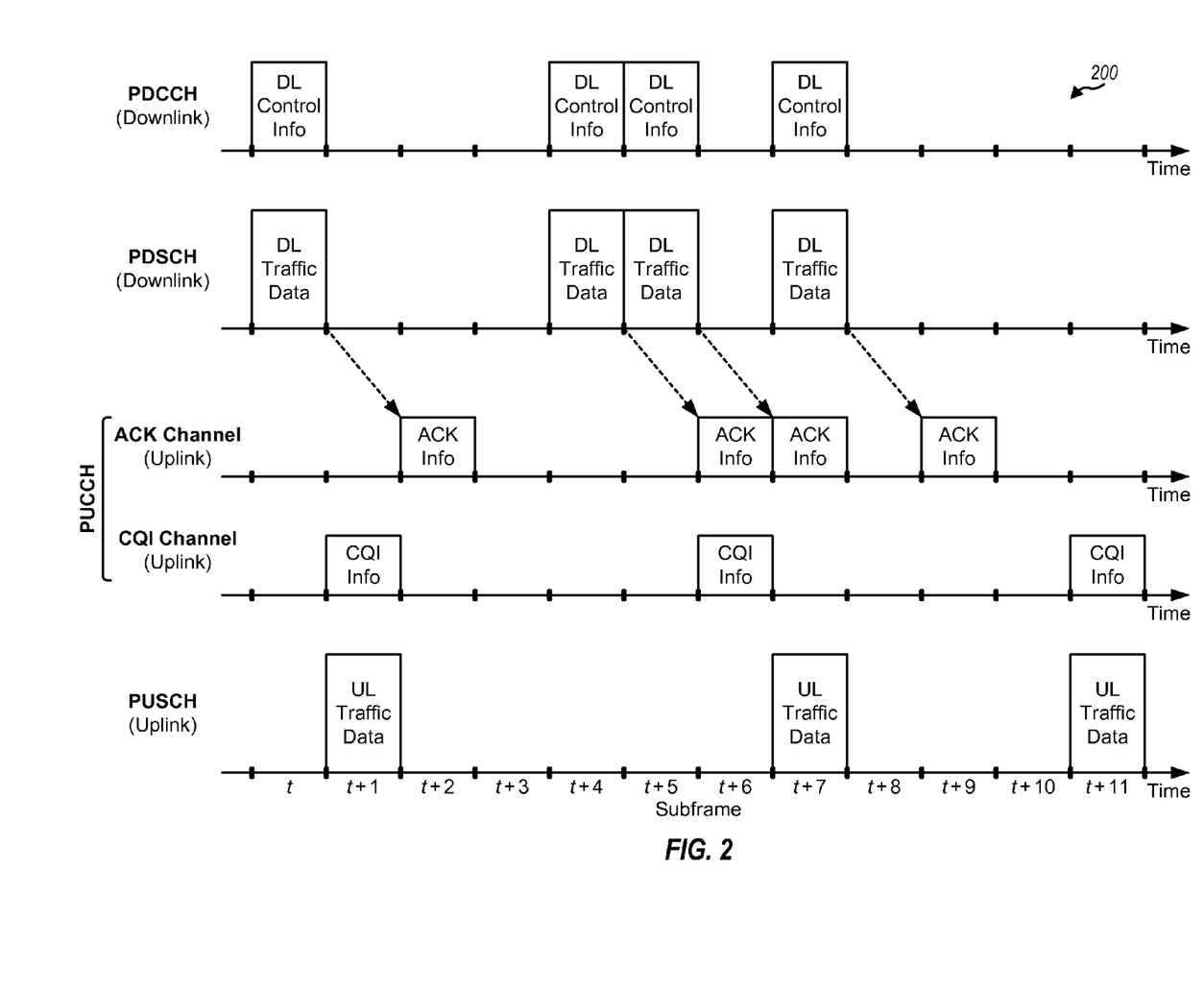
FIG. 2 shows example transmissions on the downlink and uplink.

FIG. 2 shows example downlink transmissions by a Node B and example uplink transmissions by a UE. The transmission timeline may be partitioned into units of subframes. Each subframe may have a predetermined time duration, e.g., one millisecond (ms). The UE may periodically estimate the downlink channel quality for the Node B and may send CQI information on a CQI channel to the Node B. The Node B may use the CQI information and/or other information to select the UE for downlink data transmission and to select one or more modulation and coding schemes (MCSs) for the UE. The Node B may process traffic data in accordance with the selected MCS(s) and may send the traffic data on the PDSCH to the UE. The Node B may also send control information (e.g., a scheduling assignment) on the PDCCH to the UE. The UE may process the PDCCH to receive the scheduling assignment. The UE may then process the PDSCH in accordance with the scheduling assignment to recover the traffic data sent to the UE. The UE may generate ACK information based on decoding results for the traffic data and may send the ACK information on an ACK channel. The ACK and CQI channels may be part of the PUCCH. The Node B may resend the traffic data if a negative acknowledgement (NAK) is received from the UE and may send new traffic data if an ACK is received.

In general, a Node B may send traffic data and/or control information on the downlink to a UE. The UE may also send traffic data and/or control information on the uplink to the Node B. The techniques described herein may be used to send control information on the downlink or the uplink. For clarity, much of the description below is for sending control information on the downlink.

A Node B may be equipped with multiple (T) antennas that may be used for data transmission and reception. The Node B may send a multiple-input single-output (MISO) transmission to a UE equipped with a single antenna. The Node B may send a multiple-input multiple-output (MIMO) transmission to a UE equipped with multiple antennas. The Node B may send the MISO and/or MIMO transmission with beamforming in order to improve performance. The Node B may perform beamforming for the traffic data, as follows:

$$x(k)=Wd(k), \quad \text{Eq (1)}$$

where $d(k)$ is an M×1 vector of data symbols to send on subcarrier k,
W is a T×M precoding matrix, and
$x(k)$ is a T×1 vector of output symbols for subcarrier k.

The Node B may send M data symbol streams on M layers to a UE equipped with R antennas, where in general $R \geq 1$ and $1 \leq M \leq \min\{T, R\}$. The Node B may perform beamforming to achieve higher throughput and/or better coverage for the UE. The UE (or possibly the Node B) may perform rank selection to determine the number of data symbol streams (M) to send and to select the particular precoding matrix to use for beamforming. Rank selection may be performed based on (i) an estimate of the wireless channel from the Node B to the UE and (ii) an estimate of the noise and interference observed at the UE. The precoding matrix W may include M columns for the M data symbol streams to be sent simultaneously. If M=1, then the precoding matrix includes one column and may be referred to as a precoding vector. The UE may also determine CQI information indicative of the received signal quality of the M layers based on the selected precoding matrix, the channel estimate, and the noise and interference estimate. The UE may send the selected precoding matrix as well as the CQI information for the M layers to the Node B. The Node B may process (e.g., encode and modulate) the M data symbol streams based on the CQI information and may perform beamforming for the M data symbol streams based on the selected precoding matrix.

Beamforming may be performed as described in commonly assigned U.S. patent application Ser. No. 12/189,483, entitled "EIGEN-BEAMFORMING FOR WIRELESS COMMUNICATION SYSTEMS," filed Aug. 11, 2008. Rank selection to select the number of data symbol streams and the precoding matrix may be performed as described in commonly assigned U.S. patent application Ser. No. 11/449,893, entitled "ROBUST RANK PREDICTION FOR A MIMO SYSTEM," filed Jun. 9, 2006.

As shown in FIG. 2, the Node B may send control information on the PDCCH and may send traffic data on the PDSCH to the UE. The Node B may perform beamforming for the traffic data sent on the PDSCH. It is desirable to send the control information such that it can be reliably received by the UE. The Node B may use a stronger modulation and coding scheme for the control information and/or may repeat the control information one or more times in order to improve reliability. However, more radio resources may be used to send the control information with a stronger modulation and coding scheme and/or repetition.

In an aspect, the Node B may send control information with beamforming in the same or similar manner as traffic data. The precoding matrix W may be selected to provide good performance for traffic data. The same precoding matrix W may be used for beamforming of control information. Beamforming may improve coverage for control information and/or provide other advantages.

In one design, the Node B may send one symbol stream of control information (or one control symbol stream) regardless of the number of data symbol streams being sent. The Node B may send this one control symbol stream using one column of the precoding matrix W used for traffic data. The Node B may perform beamforming for this control symbol stream, as follows:

$$y(k)=wc(k), \quad \text{Eq (2)}$$

where $c(k)$ is a control symbol to send on subcarrier k,
w is a T×1 precoding vector for control information, and
$y(k)$ is a T×1 vector of output symbols for subcarrier k.

The precoding vector w may be one column of the precoding matrix W used for traffic data. For example, the precoding vector w may be the column of W for the best layer among the M layers used for traffic data. The best layer may be identified by the CQI information for the M layers.

In another design, the Node B may send M control symbol streams, which matches the number of data symbol streams. The Node B may send the M control symbol streams using all M columns of the precoding matrix W. The Node B may perform beamforming for the M control symbol streams, as follows:

$$y(k) = Wc(k), \quad \text{Eq (3)}$$

where c(k) is an M×1 vector of control symbols to send on subcarrier k.

In general, the Node B may send any number of control symbol streams with beamforming using any number of columns of the precoding matrix W used for traffic data. Control information may have higher reliability requirements than traffic data. The Node B may use a stronger modulation and coding scheme, higher transmit power, etc., to obtain the desired reliability for control information.

In another aspect, beamforming for control information may be selectively performed based on various factors. In one design, beamforming may be performed for control information when beamforming is also performed for traffic data. In another design, beamforming may be performed for certain types of traffic data and not for other types of traffic data. In yet another design, beamforming may be performed for control information for UEs supporting this feature and not for UEs not supporting this feature. For example, a later version of LTE specification may support beamforming for control information, and beamforming may be avoided for legacy UEs supporting the original version of LTE specification. Beamforming for control information may also be selectively performed based on other factors.

In yet another aspect, a control channel such as the PDCCH may be partitioned to support both beamforming and no beamforming for control information. The control channel may be partitioned in various manners to obtain a beamformed section and a non-beamformed section. Control information may be sent with beamforming in the beamformed section and without beamforming in the non-beamformed section. Control information for a given UE may be sent in either the beamformed or non-beamformed section depending on any of the factors described above. The partitioning of the control channel may be dependent on the type of resources available for sending control information.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 3:
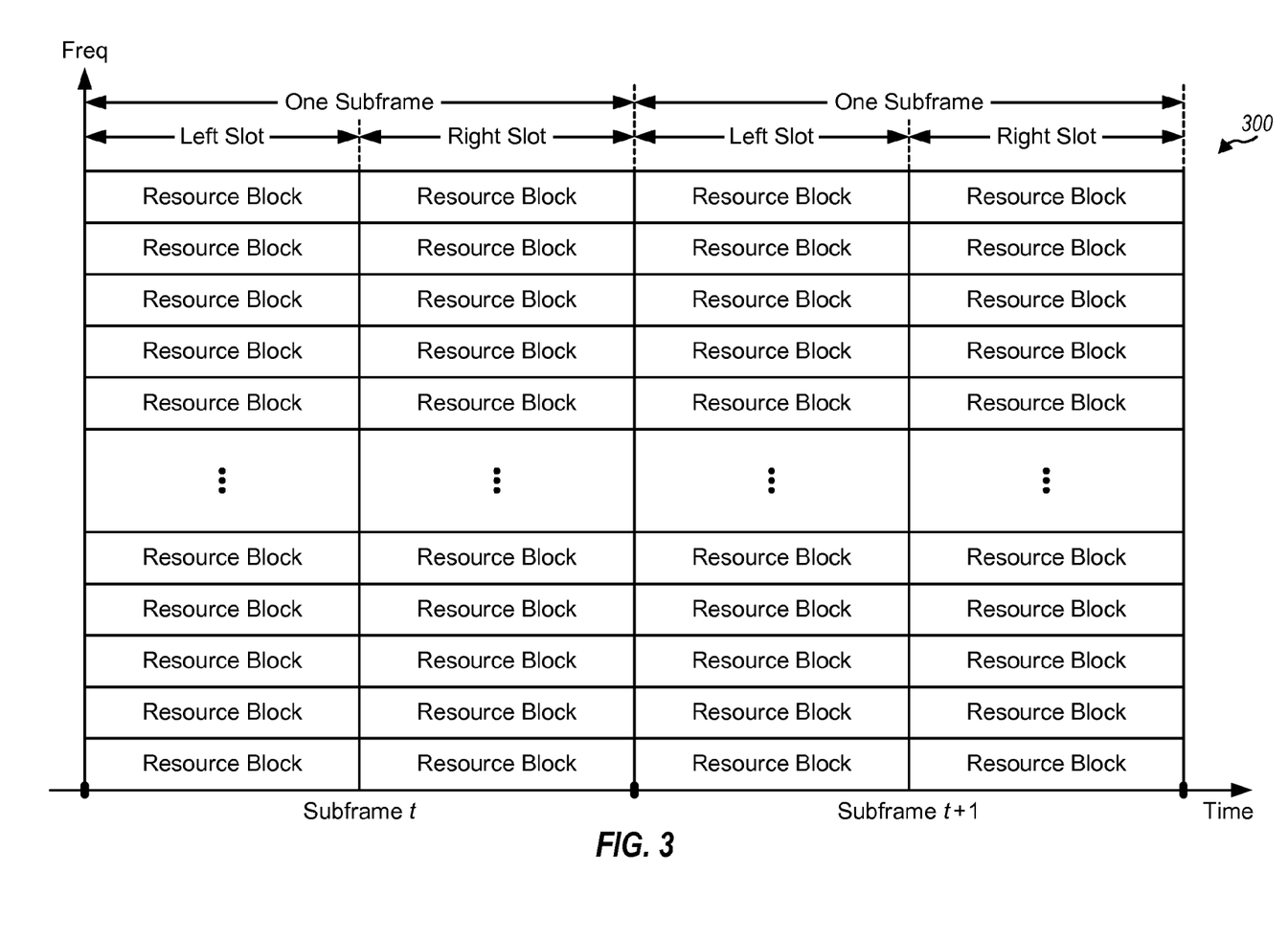
FIG. 3 shows an example transmission structure.

FIG. 3 shows a design of a transmission structure 300 that may be used for the downlink or uplink. The transmission timeline may be partitioned into units of subframes. Each subframe may be partitioned into two slots—a first/left slot and a second/right slot. Each slot may include a fixed or configurable number of symbol periods, e.g., six symbol periods for an extended cyclic prefix or seven symbol periods for a normal cyclic prefix.

The K total subcarriers may be grouped into resource blocks. Each resource block may include N subcarriers (e.g., N=12 subcarriers) in one slot. The available resource blocks may be assigned to UEs for transmission of traffic data and control information.

Figure 4:
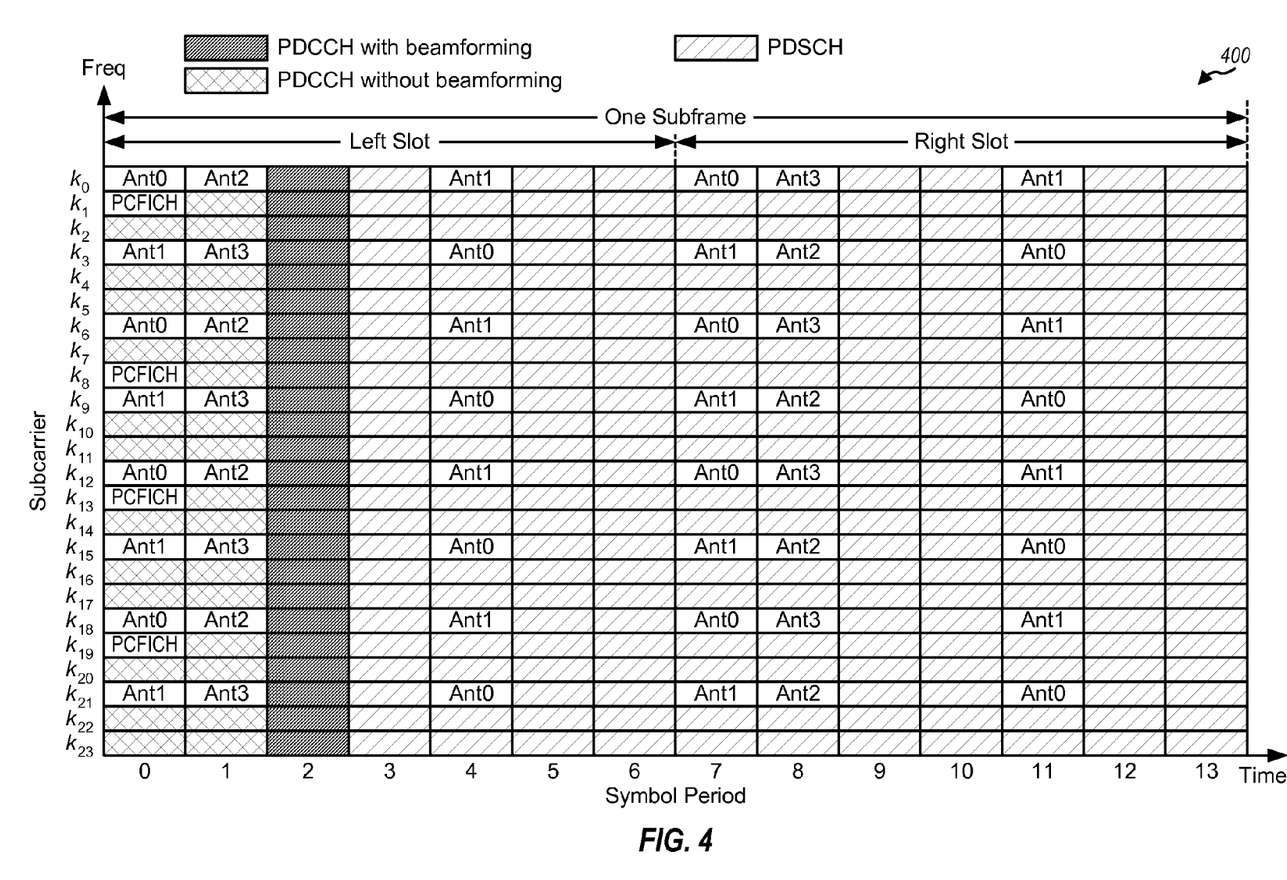
FIG. 4 shows a control channel structure with time division multiplexing of beamformed and non-beamformed control information.

FIG. 4 shows a design of a control channel structure 400 with time division multiplexing (TDM) of the beamformed and non-beamformed sections for control information. For the normal cyclic prefix in LTE, the left slot includes seven symbol periods 0 through 6, and the right slot includes seven symbol periods 7 through 13. FIG. 4 shows four resource blocks, with each resource block including 12 subcarriers in 7 symbol periods. The two top resource blocks include subcarriers $k_0$ through $k_{11}$, and the two bottom resource blocks include subcarriers $k_{12}$ through $k_{23}$. Each resource block includes 84 resource elements. Each resource element corresponds to one subcarrier in one symbol period and may be used to send one modulation symbol.

Some resource elements in symbol periods 0, 1 and 4 of the left slot and in symbol periods 7, 8 and 11 of the right slot may be used to send pilot symbols. FIG. 4 shows a case in which the Node B transmits on four antennas. The pilot symbols for antennas 0, 1, 2 and 3 are labeled as "Ant0", "Ant1", "Ant2" and "Ant3", respectively. As shown in FIG. 4, pilot symbols are sent from antennas 0 and 1 in the first and fifth symbol periods of each slot and from antennas 2 and 3 in the second symbol period of each slot. For each antenna, pilot symbols are sent on subcarriers that are spaced apart by six subcarriers. In each symbol period in which pilot symbols are sent, the pilot symbols for an odd-numbered antenna are interlaced with the pilot symbols for an even-numbered antenna.

Some resource elements in symbol period 0 of the left slot may be used to send a Physical Control Format Indicator Channel (PCFICH), which may convey partition information. The partition information may convey the partitioning of the resource blocks into a first segment for the PDSCH and a second segment for the PDCCH. In one design, the partition information may convey whether 1, 2 or 3 OFDM symbols are used for the PDCCH. The partition information may also convey the partitioning of the second segment for the PDCCH into a beamformed section and a non-beamformed section.

In the example shown in FIG. 4, the PDCCH occupies the first three symbol periods 0, 1 and 2 of the left slot, and the PDSCH occupies the remaining 11 symbol periods 3 through 13 of the left and right slots. In the TDM design shown in FIG. 4, the non-beamformed section of the PDCCH occupies the first two symbol periods 0 and 1 of the left slot, and the beamformed section of the PDCCH occupies the third symbol period 2 of the left slot. In general, for the TDM design, the beamformed and non-beamformed sections may cover different symbol periods, and each section may cover any number of symbol periods.

Figure 5:
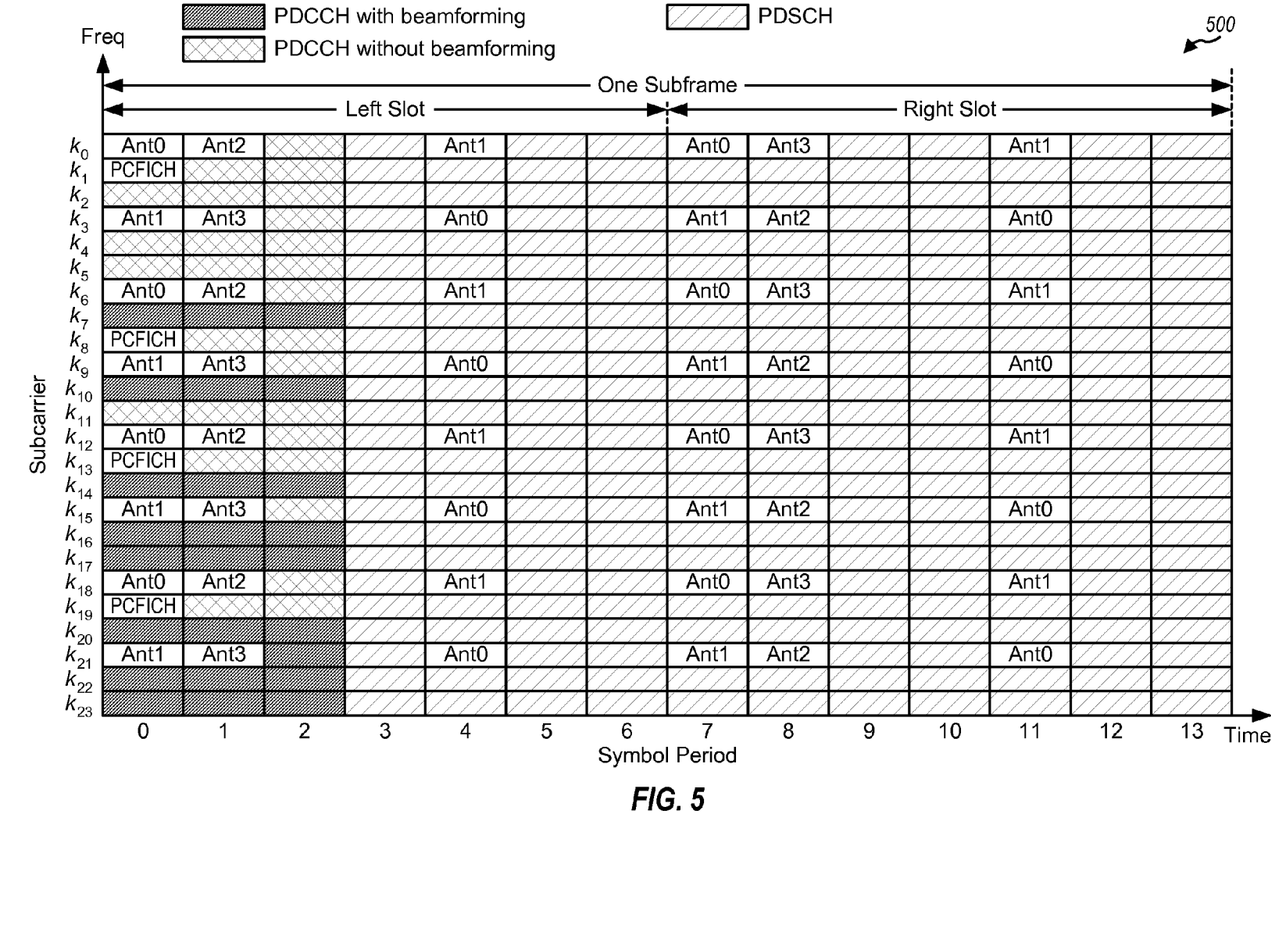
FIG. 5 shows a control channel structure with frequency division multiplexing of beamformed and non-beamformed control information.

FIG. 5 shows a design of a control channel structure 500 with frequency division multiplexing (FDM) of the beamformed and non-beamformed sections for control information. The resource elements used for pilot symbols and partition information are shown in FIG. 5 and are described above for FIG. 4. In the example shown in FIG. 5, the PDCCH occupies the first three symbol periods 0, 1 and 2 of the left slot, and the PDSCH occupies the remaining 11 symbol periods 3 through 13 of the left and right slots. In the FDM design shown in FIG. 5, the non-beamformed section of the PDCCH covers 15 subcarriers $k_0$ through $k_6$, $k_8$, $k_9$, $k_{11}$, $k_{12}$, $k_{13}$, $k_{15}$, $k_{18}$ and $k_{19}$. The beamformed section of the PDCCH covers 9 subcarriers $k_7$, $k_{10}$, $k_{14}$, $k_{16}$, $k_{17}$ and $k_{20}$ through $k_{23}$. In general, for the FDM design, the beamformed and non-beamformed sections cover different subcarriers, and each section may cover any number of subcarriers.

In another design, the resource elements for the PUCCH may be partitioned into strips. Each strip may cover a particular number of subcarriers (e.g., four subcarriers) in a particular number of symbol periods (e.g., three symbol periods). Each strip may be used for beamforming or no beamforming.

In general, any multiplexing scheme may be used to partition a control channel into a beamformed section and a non-beamformed section. For example, each of the resource elements for the control channel may be allocated to the beamformed or non-beamformed section. More complicated partitioning of the control channel to the beamformed and non-beamformed sections may be conveyed with more partition information.

Some example designs for sending control information with and without beamforming in the same resource block have been described above. In another design, each resource block may be used to send control information either with or without beamforming. This design performs multiplexing of beamformed and non-beamformed control information at the resource block level. Multiplexing of beamformed and non-beamformed control information may also be performed in other manners.

A Node B may send a cell-specific reference signal (which may also be referred to as a common pilot) and/or UE-specific reference signals (which may also be referred to as dedicated pilots) on the downlink. A reference signal is a signal that is known a priori by both a transmitter and a receiver. A reference signal may also be referred to as pilot, preamble, training signal, etc. The Node B may send the reference signals in resource elements labeled "Ant0" through "Ant3" in FIGS. 4 and 5 and/or in other resource elements. The Node B may periodically send the cell-specific reference signal across the entire system bandwidth without beamforming, e.g., in one symbol period of each slot. The UEs may use the cell-specific reference signal for channel estimation, channel quality estimation, signal strength measurement, etc. The Node B may send traffic data in a resource block to a UE and may send a UE-specific reference signal in the resource block. The Node B may send the UE-specific reference signal with or without beamforming. The UE may use the UE-specific reference signal for demodulation of the traffic data.

The system may utilize frequency division duplexing (FDD) or time division duplexing (TDD). For FDD, the downlink and uplink may be allocated separate frequency channels, and the channel response for the downlink may be uncorrelated with the channel response for the uplink. For TDD, the downlink and uplink may share the same frequency channel, and the downlink channel response may be correlated with the uplink channel response.

A precoding matrix used for beamforming may be determined in various manners. For FDD, a UE may estimate the downlink channel response and the downlink noise and interference based on a cell-specific reference signal sent by a Node B. The UE may perform rank selection and determine the number of data symbol streams (M) to send on the downlink and the particular precoding matrix to use based on the downlink channel estimate and the downlink noise and interference estimate. The UE may generate precoding matrix indicator (PMI) information indicative of the selected precoding matrix and the rank M. The UE may also generate CQI information indicative of the received signal quality for each of the M data symbol streams. The UE may send the PMI and CQI information to the Node B. The Node B may encode and modulate M data symbol streams based on the reported CQI information and may perform beamforming for the M data symbol streams based on the reported PMI information.

For TDD, a UE may generate PMI and CQI information in the same manner as for FDD and may send the PMI and CQI information to a Node B. Alternatively, the UE may send a sounding reference signal on the uplink and may also send CQI information. The Node B may estimate the uplink channel response and the uplink noise and interference based on the sounding reference signal sent by the UE. The Node B may use a calibrated version of the uplink channel estimate as a downlink channel estimate by assuming channel reciprocity with TDD. The Node B may also estimate the downlink noise and interference based on the uplink noise and interference estimate obtained by the Node B and/or the CQI information received from the UE. The Node B may perform rank selection and determine the number of data symbol streams (M) to send on the downlink and the particular precoding matrix to use based on the downlink channel estimate and the downlink noise and interference estimate. The Node B may also determine a modulation and coding scheme for each data symbol stream based on the selected precoding matrix, the downlink channel estimate, and the downlink noise and interference estimate. The Node B may encode and modulate M data symbol streams based on the selected modulation and coding schemes and may perform beamforming for the M data symbol streams based on the selected precoding matrix.

For both FDD and TDD, a Node B may perform beamforming for control information for a UE based on the precoding matrix used for traffic data for the UE. The Node B may send one or more control symbol streams to the UE using one or more columns of the precoding matrix, as described above. The Node B may also send a UE-specific reference signal to the UE. The Node B may perform beamforming for the UE-specific reference signal, e.g., using the column of the precoding matrix used for control information.

Figure 6:
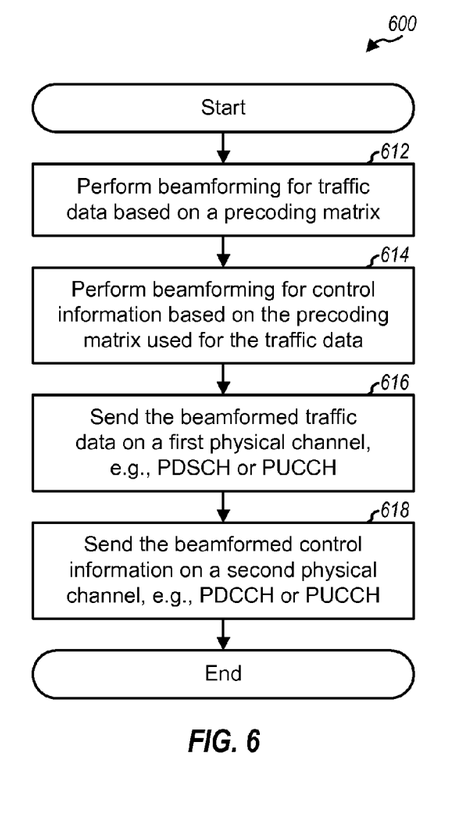
FIG. 6 shows a process for sending traffic data and control information.

FIG. 6 shows a design of a process 600 for sending traffic data and control information in a wireless communication system. Process 600 may be performed by a transmitter, which may be a Node B for downlink transmission or a UE for uplink transmission.

The transmitter may perform beamforming for traffic data based on a precoding matrix (block 612). The transmitter may also perform beamforming for control information based on the precoding matrix used for the traffic data (block 614). For block 612, the transmitter may perform beamforming based on M columns of the precoding matrix to send the traffic data on M layers, where M may be one or greater. In one design of block 614, the transmitter may perform beamforming based on one column of the precoding matrix to send the control information on one layer. In general, the transmitter may perform beamforming based on up to M columns of the precoding matrix to send the control information on up to M layers.

The transmitter may send the beamformed traffic data on a first physical channel (block 616). The transmitter may send the beamformed control information on a second physical channel (block 618). In one design, the transmitter may send the beamformed traffic data in a first segment of a resource block and may send the beamformed control information in a second segment of the resource block, e.g., as shown in FIGS. 4 and 5. The first segment may be allocated to the first physical channel, and the second segment may be allocated to the second physical channel. For downlink transmission, the first physical channel may comprise the PDSCH, and the second physical channel may comprise the PDCCH. For uplink transmission, the first physical channel may comprise the PUSCH, and the second physical channel may comprise the PUCCH.

In one design, the transmitter may send non-beamformed control information in a first section of a resource block and may send the beamformed control information in a second section of the resource block. The first and second sections may be time division multiplexed and cover different symbol periods, e.g., as shown in FIG. 4. The first and second sections may also be frequency division multiplexed and cover different subcarriers, e.g., as shown in FIG. 5.

For downlink transmission, the transmitter may be a Node B that sends traffic data and control information to a first UE in blocks 612 through 618. The control information may comprise a scheduling assignment for the first UE. The Node B may process (e.g., encode and modulate) and send the traffic data in accordance with the scheduling assignment. The Node B may perform beamforming for traffic data and control information for a second UE based on a second precoding matrix. The Node B may send the beamformed traffic data for the second UE on the first physical channel and may send the beamformed control information for the second UE on the second physical channel. For FDD or TDD, the Node B may receive the precoding matrix from the first UE and may receive the second precoding matrix from the second UE. For TDD, the Node B may derive the precoding matrix based on a first reference signal received from the first UE and may derive the second precoding matrix based on a second reference signal received from the second UE. The first and second reference signals may be sounding reference signals or some other reference signals.

Figure 7:
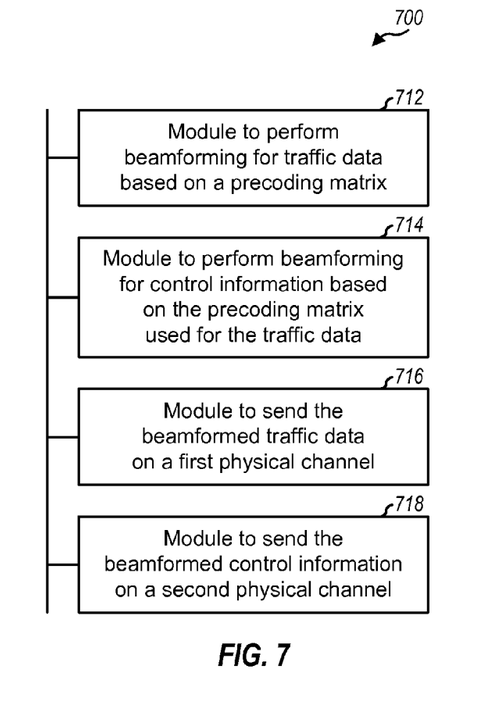
FIG. 7 shows an apparatus for sending traffic data and control information.

FIG. 7 shows a design of an apparatus 700 for sending traffic data and control information in a wireless communication system. Apparatus 700 includes a module 712 to perform beamforming for traffic data based on a precoding matrix, a module 714 to perform beamforming for control information based on the precoding matrix used for the traffic data, a module 716 to send the beamformed traffic data on a first physical channel, and a module 718 to send the beamformed control information on a second physical channel.

Figure 8:
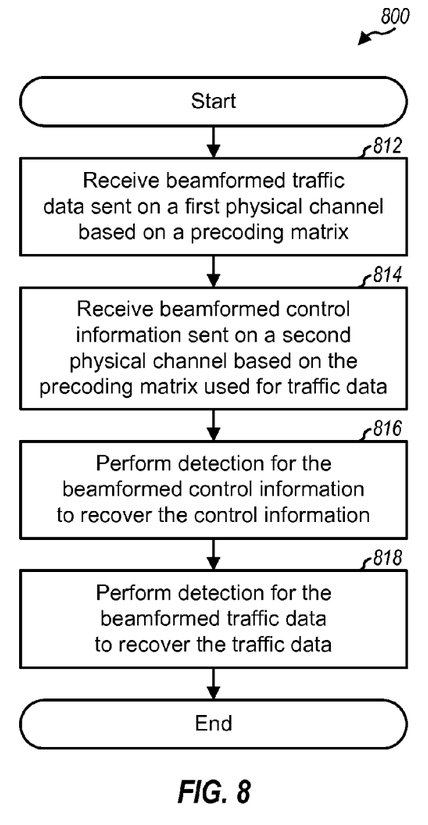
FIG. 8 shows a process for receiving traffic data and control information.

FIG. 8 shows a design of a process 800 for receiving traffic data and control information in a wireless communication system. Process 800 may be performed by a receiver, which may be a UE for downlink transmission or a Node B for uplink transmission.

The receiver may receive beamformed traffic data sent on a first physical channel based on a precoding matrix (block 812). The receiver may also receive beamformed control information sent on a second physical channel based on the precoding matrix used for traffic data (block 814). The receiver may receive the beamformed traffic data sent on M layers based on M columns of the precoding matrix, where M may be one or greater. The receiver may receive the beamformed control information sent on up to M layers based on up to M columns of the precoding matrix. The receiver may receive the beamformed traffic data in a first segment of a resource block and may receive the beamformed control information in a second segment of the resource block. The first segment may be allocated to the first physical channel, and the second segment may be allocated to the second physical channel. The beamformed control information may also be time division multiplexed or frequency division multiplexed with non-beamformed control information in a resource block.

The receiver may perform detection for the beamformed control information to recover the control information (block 816). The receiver may perform detection for the beamformed traffic data to recover the traffic data (block 818). The receiver may perform detection based on minimum mean square error (MMSE), zero-forcing equalization, MMSE with successive interference cancellation, or some other detection technique. The receiver may use the control information to determine the resources used to send the traffic data and/or to process (e.g., demodulate and decode) the traffic data.

Figure 9:
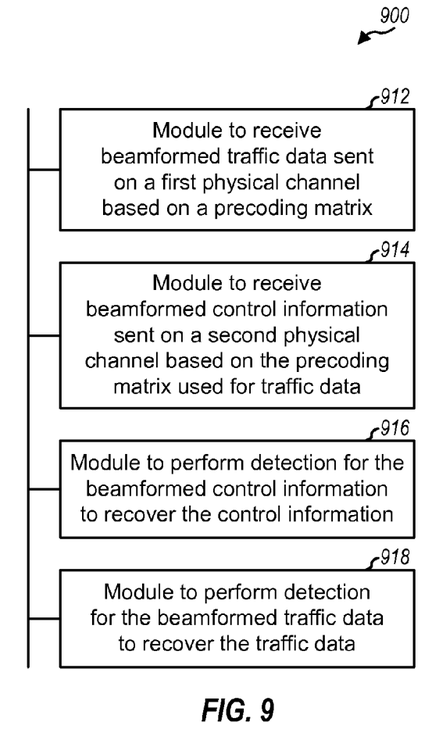
FIG. 9 shows an apparatus for receiving traffic data and control information.

FIG. 9 shows a design of an apparatus 900 for receiving traffic data and control information in a wireless communication system. Apparatus 900 includes a module 912 to receive beamformed traffic data sent on a first physical channel based on a precoding matrix, a module 914 to receive beamformed control information sent on a second physical channel based on the precoding matrix used for traffic data, a module 916 to perform detection for the beamformed control information to recover the control information, and a module 918 to perform detection for the beamformed traffic data to recover the traffic data.

The modules in FIGS. 7 and 9 may comprise processors, electronics devices, hardware devices, electronics components, logical circuits, memories, etc., or any combination thereof.

Figure 10:
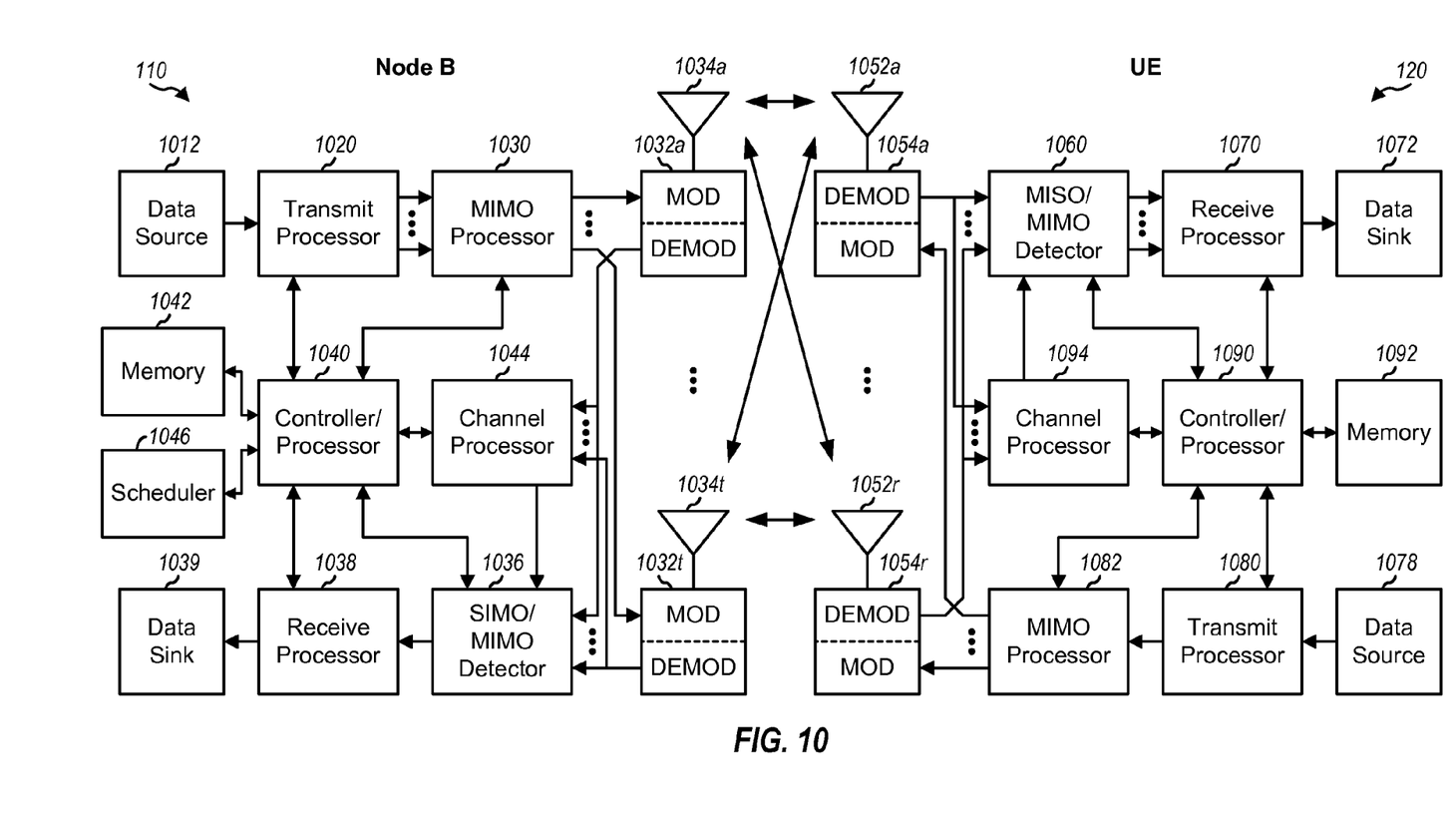
FIG. 10 shows a block diagram of a Node B and a UE.

FIG. 10 shows a block diagram of a design of a Node B 110 and a UE 120, which may be one of the Node Bs and one of the UEs in FIG. 1. Node B 110 is equipped with T antennas 1034a through 1034t, and UE 120 is equipped with R antennas 1052a through 1052r, where T>1 and R≧1.

At Node B 110, a transmit processor 1020 may receive traffic data for one or more UEs from a data source 1012, process (e.g., encode and modulate) the traffic data for each UE based on one or more modulation and coding schemes, and provide data symbols for all UEs. Transmit processor 1020 may also generate control symbols for control information for the UEs. Transmit processor 1020 may further generate pilot symbols for one or more reference signals, e.g., a cell-specific reference signal, UE-specific reference signals, etc. Transmit processor 1020 may multiplex the data symbols, the control symbols, and the pilot symbols, e.g., as described above. A MIMO processor 1030 may perform beamforming for the data symbols and the control symbols for each UE based on a precoding matrix selected for that UE. MIMO processor 1030 may provide T output symbol streams to T modulators (MOD) 1032a through 1032t. Each modulator 1032 may process its output symbol stream (e.g., for OFDM) to obtain an output sample stream. Each modulator 1032 may further condition (e.g., convert to analog, filter, amplify, and upconvert) its output sample stream and generate a downlink signal. T downlink signals from modulators 1032a through 1032t may be transmitted via antennas 1034a through 1034t, respectively.

At UE 120, R antennas 1052a through 1052r may receive the T downlink signals from Node B 110, and each antenna 1052 may provide a received signal to an associated demodulator (DEMOD) 1054. Each demodulator 1054 may condition (e.g., filter, amplify, downconvert, and digitize) its received signal to obtain samples and may further process the samples (e.g., for OFDM) to obtain received symbols. Each demodulator 1054 may provide received data symbols and received control symbols to a MISO/MIMO detector 1060 and may provide received pilot symbols to a channel processor 1094. Channel processor 1094 may estimate the downlink channel from Node B 110 to UE 120 based on the received pilot symbols and may provide a downlink channel estimate to detector 1060. Detector 1060 may perform detection on the received data symbols and the received control symbols based on the downlink channel estimate and provide symbol estimates, which are estimates of the transmitted symbols. A receive processor 1070 may process (e.g., demodulate and decode) the symbol estimates, provide decoded traffic data to a data sink 1072, and provide decoded control information to a controller/processor 1090.

UE 120 may estimate the downlink channel quality and generate control information, which may comprise PMI information, CQI information, etc. The control information, traffic data from a data source 1078, and one or more reference signals (e.g., a sounding reference signal, a demodulation reference signal, etc.) may be processed (e.g., encoded and modulated) by a transmit processor 1080, beamformed by a MIMO processor 1082 (if applicable), and further processed by modulators 1054a through 1054r to generate R uplink signals, which may be transmitted via antennas 1052a through 1052r. At Node B 110, the R uplink signals from UE 120 may be received by antennas 1034a through 1034t and processed by demodulators 1032a through 1032t. A channel processor 1044 may estimate the uplink channel from UE 120 to Node B 110 and may provide an uplink channel estimate to single-input multiple-output (SIMO)/MIMO detector 1036. Detector 1036 may perform detection based on the uplink channel estimate and provide symbol estimates. A receive processor 1038 may process the symbol estimates, provide decoded traffic data to a data sink 1039, and provide decoded control information to a controller/processor 1040. Controller/processor 1040 may control data transmission to UE 120 based on the control information received from UE 120.

Controllers/processors 1040 and 1090 may direct the operation at Node B 110 and UE 120, respectively. Controllers/processors 1040 and 1090 may each perform or direct process 600 in FIG. 6 for data transmission, process 800 for data reception, and/or other processes for the techniques described herein. Memories 1042 and 1092 may store data and program codes for Node B 110 and UE 120, respectively. A scheduler 1046 may select UE 120 and/or other UEs for data transmission on the downlink and/or uplink based on the control information received from the UEs. Scheduler 1046 may also assign resources for traffic data and control information to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending traffic data and control information in a wireless communication system, comprising:
performing beamforming for traffic data by multiplying a precoding matrix with a vector of data symbols to be sent on at least one of a plurality of subcarriers;
performing beamforming for control information by multiplying the precoding matrix with a vector of control symbols to be sent on at least one of the plurality of subcarriers;
sending the beamformed traffic data on a first physical channel;
sending the beamformed control information on a second physical channel; and
sending non-beamformed control information in a first section of a resource block, wherein the sending the beamformed control information comprises sending the beamformed control information in a second section of the resource block.

2. A method of sending traffic data and control information in a wireless communication system, comprising:
performing beamforming for traffic data by multiplying a precoding matrix with a vector of data symbols to be sent on at least one of a plurality of subcarriers;
performing beamforming for control information by multiplying the precoding matrix with a vector of control symbols to be sent on at least one of the plurality of subcarriers;
sending the beamformed traffic data on a first physical channel; and
sending the beamformed control information on a second physical channel, wherein the performing beamforming for the traffic data comprises performing beamforming based on M columns of the precoding matrix to send the traffic data on M layers, where M is one or greater.

3. The method of claim 2, wherein the performing beamforming for the control information comprises performing beamforming based on one column of the precoding matrix to send the control information on one layer.

4. The method of claim 2, wherein the performing beamforming for the control information comprises performing beamforming based on up to M columns of the precoding matrix to send the control information on up to M layers.

5. The method of claim 1, wherein the first and second sections of the resource block are time division multiplexed and cover different symbol periods.

6. The method of claim 1, wherein the first and second sections of the resource block are frequency division multiplexed and cover different ones of the subcarriers.

7. A method of sending traffic data and control information in a wireless communication system, comprising:
performing beamforming for traffic data by multiplying a precoding matrix with a vector of data symbols to be sent on at least one of a plurality of subcarriers;
performing beamforming for control information by multiplying the precoding matrix with a vector of control symbols to be sent on at least one of the plurality of subcarriers;
sending the beamformed traffic data on a first physical channel; and
sending the beamformed control information on a second physical channel, wherein the sending the beamformed traffic data comprises sending the beamformed traffic data in a first segment of a resource block, the first segment being allocated to the first physical channel, and wherein the sending the beamformed control information comprises sending the beamformed control information in a second segment of the resource block, the second segment being allocated to the second physical channel.

8. A method of sending traffic data and control information in a wireless communication system, comprising:
performing beamforming for traffic data by multiplying a precoding matrix with a vector of data symbols to be sent on at least one of a plurality of subcarriers;
performing beamforming for control information by multiplying the precoding matrix with a vector of control symbols to be sent on at least one of the plurality of subcarriers;
sending the beamformed traffic data on a first physical channel; and
sending the beamformed control information on a second physical channel, wherein the traffic data, the control information, and the precoding matrix are for a first user equipment (UE), the method further comprising:
performing beamforming for traffic data for a second UE based on a second precoding matrix;
performing beamforming for control information for the second UE based on the second precoding matrix;
sending the beamformed traffic data for the second UE on the first physical channel; and
sending the beamformed control information for the second UE on the second physical channel.

9. The method of claim 8, further comprising:
receiving the precoding matrix from the first UE; and
receiving the second precoding matrix from the second UE.

10. The method of claim 8, further comprising:
deriving the precoding matrix based on a first reference signal received from the first UE; and
deriving the second precoding matrix based on a second reference signal received from the second UE.

11. A method of sending traffic data and control information in a wireless communication system, comprising:
performing beamforming for traffic data by multiplying a precoding matrix with a vector of data symbols to be sent on at least one of a plurality of subcarriers;
performing beamforming for control information by multiplying the precoding matrix with a vector of control symbols to be sent on at least one of the plurality of subcarriers;
sending the beamformed traffic data on a first physical channel; and
sending the beamformed control information on a second physical channel, wherein the control information comprises a scheduling assignment for a user equipment (UE), and wherein the traffic data is sent in accordance with the scheduling assignment.

12. The method of claim 1, wherein the first physical channel comprises a physical downlink shared channel (PDSCH) or a physical uplink shared channel (PUSCH), and wherein the second physical channel comprises a physical downlink control channel (PDCCH) or a physical uplink control channel (PUCCH).

13. An apparatus for wireless communication, comprising:
at least one processor configured to perform beamforming for traffic data by multiplying a precoding matrix with a vector of data symbols to be sent on at least one of a plurality of subcarriers, to perform beamforming for control information by multiplying the precoding matrix with a vector of control symbols to be sent on at least one of the plurality of subcarriers, to send the beamformed traffic data on a first physical channel, and to send the beamformed control information on a second physical channel, wherein the at least one processor is configured to send the beamformed traffic data in a first segment of a resource block and to send the beamformed control information in a second segment of the resource block, the first segment being allocated to the first physical channel, and the second segment being allocated to the second physical channel.

14. An apparatus for wireless communication, comprising:
at least one processor configured to perform beamforming for traffic data by multiplying a precoding matrix with a vector of data symbols to be sent on at least one of a plurality of subcarriers, to perform beamforming for control information by multiplying the precoding matrix with a vector of control symbols to be sent on at least one of the plurality of subcarriers, to send the beamformed traffic data on a first physical channel, and to send the beamformed control information on a second physical channel, wherein the at least one processor is configured to perform beamforming based on M columns of the precoding matrix to send the traffic data on M layers, where M is one or greater, and to perform beamforming based on one column of the precoding matrix to send the control information on one layer.

15. An apparatus for wireless communication, comprising:
at least one processor configured to perform beamforming for traffic data by multiplying a precoding matrix with a vector of data symbols to be sent on at least one of a plurality of subcarriers, to perform beamforming for control information by multiplying the precoding matrix with a vector of control symbols to be sent on at least one of the plurality of subcarriers, to send the beamformed traffic data on a first physical channel, and to send the beamformed control information on a second physical channel, wherein the at least one processor is configured to send non-beamformed control information in a first section of a resource block, and to send the beamformed control information in a second section of the resource block, the first and second sections of the resource block being time division multiplexed or frequency division multiplexed.

16. An apparatus for wireless communication, comprising:
means for performing beamforming for traffic data by multiplying a precoding matrix with a vector of data symbols to be sent on at least one of a plurality of subcarriers;
means for performing beamforming for control information by multiplying the precoding matrix with a vector of control symbols to be sent on at least one of the plurality of subcarriers;
means for sending the beamformed traffic data on a first physical channel; and
means for sending the beamformed control information on a second physical channel, wherein the means for sending the beamformed traffic data comprises means for sending the beamformed traffic data in a first segment of a resource block, the first segment being allocated to the first physical channel, and wherein the means for sending the beamformed control information comprises means for sending the beamformed control information in a second segment of the resource block, the second segment being allocated to the second physical channel.

17. An apparatus for wireless communication, comprising:
means for performing beamforming for traffic data by multiplying a precoding matrix with a vector of data symbols to be sent on at least one of a plurality of subcarriers;
means for performing beamforming for control information by multiplying the precoding matrix with a vector of control symbols to be sent on at least one of the plurality of subcarriers;
means for sending the beamformed traffic data on a first physical channel; and
means for sending the beamformed control information on a second physical channel, wherein the means for performing beamforming for the traffic data comprises means for performing beamforming based on M columns of the precoding matrix to send the traffic data on M layers, where M is one or greater, and wherein the means for performing beamforming for the control information comprises means for performing beamforming based on one column of the precoding matrix to send the control information on one layer.

18. An apparatus for wireless communication, comprising:
means for performing beamforming for traffic data by multiplying a precoding matrix with a vector of data symbols to be sent on at least one of a plurality of subcarriers;
means for performing beamforming for control information by multiplying the precoding matrix with a vector of control symbols to be sent on at least one of the plurality of subcarriers;
means for sending the beamformed traffic data on a first physical channel; and
means for sending the beamformed control information on a second physical channel, means for sending non-beamformed control information in a first section of a resource block, and wherein the means for sending the beamformed control information comprises means for sending the beamformed control information in a second section of the resource block, the first and second sections of the resource block being time division multiplexed or frequency division multiplexed.

19. A computer program product, comprising:
a non-transitory computer-readable medium comprising:
code for causing at least one computer to perform beamforming for traffic data by multiplying a precoding matrix with a vector of data symbols to be sent on at least one of a plurality of subcarriers,
code for causing the at least one computer to perform beamforming for control information by multiplying the precoding matrix with a vector of control symbols to be sent on at least one of the plurality of subcarriers,
code for causing the at least one computer to send the beamformed traffic data on a first physical channel,
code for causing the at least one computer to send the beamformed control information on a second physical channel;
code for causing the at least one computer to send the beamformed traffic data in a first segment of a resource block; and
code for causing the at least one computer to send the beamformed control information in a second segment of the resource block, the first segment being allocated to the first physical channel, and the second segment being allocated to the second physical channel.

20. A method of receiving traffic data and control information in a wireless communication system, comprising:
receiving beamformed traffic data sent on a first physical channel in accordance with a multiplication of a precoding matrix with a vector of data symbols sent on at least one of a plurality of subcarriers;
receiving beamformed control information sent on a second physical channel in accordance with a multiplication of the precoding matrix with a vector of control symbols sent on at least one of the plurality of subcarriers;

performing detection for the beamformed control information to recover the control information; and performing detection for the beamformed traffic data to recover the traffic data, wherein the receiving the beamformed traffic data comprises receiving the beamformed traffic data in a first segment of a resource block, the first segment being allocated to the first physical channel, and wherein the receiving the beamformed control information comprises receiving the beamformed control information in a second segment of the resource block, the second segment being allocated to the second physical channel.

21. A method of receiving traffic data and control information in a wireless communication system, comprising:

receiving beamformed traffic data sent on a first physical channel in accordance with a multiplication of a precoding matrix with a vector of data symbols sent on at least one of a plurality of subcarriers;

receiving beamformed control information sent on a second physical channel in accordance with a multiplication of the precoding matrix with a vector of control symbols sent on at least one of the plurality of subcarriers;

performing detection for the beamformed control information to recover the control information; and performing detection for the beamformed traffic data to recover the traffic data, wherein the receiving the beamformed traffic data comprises receiving the beamformed traffic data sent on at least one layer based on at least one column of the precoding matrix, and wherein the receiving the beamformed control information comprises receiving the beamformed control information sent on one layer based on one column of the precoding matrix.

22. A method of receiving traffic data and control information in a wireless communication system, comprising:

receiving beamformed traffic data sent on a first physical channel in accordance with a multiplication of a precoding matrix with a vector of data symbols sent on at least one of a plurality of subcarriers;

receiving beamformed control information sent on a second physical channel in accordance with a multiplication of the precoding matrix with a vector of control symbols sent on at least one of the plurality of subcarriers;

performing detection for the beamformed control information to recover the control information; and performing detection for the beamformed traffic data to recover the traffic data, wherein non-beamformed control information is sent in a first section of a resource block, and wherein the beamformed control information is sent in a second section of the resource block, the first and second sections being time division multiplexed or frequency division multiplexed.

23. An apparatus for wireless communication, comprising:

at least one processor configured to receive beamformed traffic data sent on a first physical channel in accordance with a multiplication of a precoding matrix with a vector of data symbols sent on at least one of a plurality of subcarriers, to receive beamformed control information sent on a second physical channel in accordance with a multiplication of the precoding matrix with a vector of control symbols sent on at least one of the plurality of subcarriers, to perform detection for the beamformed control information to recover the control information, and to perform detection for the beamformed traffic data to recover the traffic data, wherein the at least one processor is configured to receive the beamformed traffic data in a first segment of a resource block and to receive the beamformed control information in a second segment of the resource block, the first segment being allocated to the first physical channel, and the second segment being allocated to the second physical channel.

24. An apparatus for wireless communication, comprising:

at least one processor configured to receive beamformed traffic data sent on a first physical channel in accordance with a multiplication of a precoding matrix with a vector of data symbols sent on at least one of a plurality of subcarriers, to receive beamformed control information sent on a second physical channel in accordance with a multiplication of the precoding matrix with a vector of control symbols sent on at least one of the plurality of subcarriers, to perform detection for the beamformed control information to recover the control information, and to perform detection for the beamformed traffic data to recover the traffic data, wherein the at least one processor is configured to receive the beamformed traffic data sent on at least one layer based on at least one column of the precoding matrix, and to receive the beamformed control information sent on one layer based on one column of the precoding matrix.

25. An apparatus for wireless communication, comprising:

at least one processor configured to receive beamformed traffic data sent on a first physical channel in accordance with a multiplication of a precoding matrix with a vector of data symbols sent on at least one of a plurality of subcarriers, to receive beamformed control information sent on a second physical channel in accordance with a multiplication of the precoding matrix with a vector of control symbols sent on at least one of the plurality of subcarriers, to perform detection for the beamformed control information to recover the control information, and to perform detection for the beamformed traffic data to recover the traffic data, wherein non-beamformed control information is sent in a first section of a resource block, and wherein the beamformed control information is sent in a second section of the resource block, the first and second sections being time division multiplexed or frequency division multiplexed.

* * * * *

UNITED STATES PATENT AND TRADEMARK OFFICE
CERTIFICATE OF CORRECTION

| | | |
|---|---|---|
| PATENT NO. | : 8,009,617 B2 | Page 1 of 1 |
| APPLICATION NO. | : 12/189548 | |
| DATED | : August 30, 2011 | |
| INVENTOR(S) | : Sarkar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Twentieth Day of March, 2012

David J. Kappos
*Director of the United States Patent and Trademark Office*